United States Patent
Ouyang et al.

(10) Patent No.: US 9,784,916 B2
(45) Date of Patent: Oct. 10, 2017

(54) RIGHT-ANGLE WAVEGUIDE BASED ON CIRCULAR-CYLINDER-TYPE SQUARE-LATTICE PHOTONIC CRYSTAL AND SINGLE COMPENSATION SCATTERING CYLINDER WITH HIGH REFRACTIVE INDEX

(71) Applicant: Zhengbiao Ouyang, Shenzhen (CN)

(72) Inventors: Zhengbiao Ouyang, Shenzhen (CN); Hao Huang, Shenzhen (CN)

( * ) Notice: Subject to any disclaimer, the term of this patent is extended or adjusted under 35 U.S.C. 154(b) by 0 days.

(21) Appl. No.: 15/396,487

(22) Filed: Dec. 31, 2016

(65) Prior Publication Data

US 2017/0146739 A1   May 25, 2017

Related U.S. Application Data

(63) Continuation of application No. PCT/CN2015/090880, filed on Sep. 28, 2015.

(30) Foreign Application Priority Data

Sep. 29, 2014   (CN) .......................... 2014 1 0515225

(51) Int. Cl.
   *G02B 6/12*     (2006.01)
   *G02B 6/122*    (2006.01)
   (Continued)

(52) U.S. Cl.
   CPC ........... *G02B 6/1225* (2013.01); *G02B 6/125* (2013.01); *B82Y 20/00* (2013.01); *G02B 2006/12119* (2013.01); *G02F 2202/32* (2013.01)

(58) Field of Classification Search
   CPC .................. G02B 6/125; G02B 6/1225; G02B 2006/12119; G02F 2202/32; B82Y 20/10
   (Continued)

(56) References Cited

U.S. PATENT DOCUMENTS

| 2005/0147366 A1* | 7/2005 | Large ............... B29D 11/00721 |
|  |  | 385/123 |
| 2008/0124037 A1* | 5/2008 | Noda ..................... B82Y 20/00 |
|  |  | 385/129 |

(Continued)

FOREIGN PATENT DOCUMENTS

| CN | 101561531 A | * 10/2009 | ............. G02B 6/122 |
| CN | 102830463 A | * 12/2012 | ............. G02B 6/125 |

OTHER PUBLICATIONS

"Two-dimensional photonic crystal L-shaped bent waveguide and its application to wavelength multi/demultiplexer," by Naka et al, Turkish Journal of Electrical Engineering, vol. 10. No. 2, pp. 245-247, 2002.*

(Continued)

*Primary Examiner* — Robert Tavlykaev
(74) *Attorney, Agent, or Firm* — Wayne & King LLC

(57) ABSTRACT

A high-refractive-index single-compensation-scattering-cylinder right-angle waveguide of a cylindrical square lattice photonic crystal, being a photonic crystal formed by arranging a first dielectric cylinder having a high refractive index in a background dielectric having a low refractive index in a square lattice; one row and one column of the first dielectric cylinders having a high refractive index are removed from the photonic crystal to form a right-angle waveguide; a second dielectric cylinder having a high refractive index is arranged at a turn of the right-angle waveguide; and the second dielectric cylinder is a compensation scattering cylinder, and the first dielectric cylinders are high-refractive-index cylinders. The structure has an extremely low reflectivity and an extremely high transmission rate, thus facilitating an integration of a large-scale light path.

7 Claims, 2 Drawing Sheets

(51) Int. Cl.
*G02B 6/125* (2006.01)
*B82Y 20/00* (2011.01)

(58) Field of Classification Search
USPC .................................. 385/14, 32, 39, 44, 45
See application file for complete search history.

(56) References Cited

U.S. PATENT DOCUMENTS

2012/0027038 A1* 2/2012 Noda ...................... H01S 5/105
372/45.01
2013/0256504 A1* 10/2013 Stevenson ............. G02F 1/2257
250/201.1

OTHER PUBLICATIONS

"Local density of states analysis of surface wave modes on truncated photonic crystal surfaces with nonlinear crystal" by Elson et al, Optics Express, vol. 12, No. 20, pp. 4855-4863, 2004.*

* cited by examiner

RIGHT-ANGLE WAVEGUIDE BASED ON CIRCULAR-CYLINDER-TYPE SQUARE-LATTICE PHOTONIC CRYSTAL AND SINGLE COMPENSATION SCATTERING CYLINDER WITH HIGH REFRACTIVE INDEX

CROSS-REFERENCE TO RELATED APPLICATIONS

This application is a continuation of International Patent Application No. PCT/CN2015/090880 with a filing date of Sep. 28, 2015, designating the United States, now pending, and further claims priority to Chinese Patent Application No, 201410515225.0 with a filing date of Sep. 29, 2014. The content of the aforementioned applications, including any intervening amendments thereto, are incorporated herein by reference.

TECHNICAL FIELD

The present invention relates to a photonic crystal bending waveguide, and in particular relates to a right-angle waveguide based on a circular-cylinder-type square-lattice photonic crystal and a single compensation scattering cylinder with high refractive index.

BACKGROUND OF THE PRESENT INVENTION

In 1987, E. Yablonovitch from a Bell laboratory of the United States, who was discussing about how to inhibit spontaneous radiation, and S. John from Princeton University, who was discussing about a photon localization, respectively and independently proposed the concept of photonic crystal (PhC). The PhC is a material structure formed in a way that dielectric materials are periodically arranged in space and an artificial crystal which is composed of two or more than two materials with different dielectric constants. The PhC has stronger and flexible control capability for propagation of light and high transmission efficiency for linear transmission and, sharp right-angle transmission. If a line defect is introduced into the structure of the PhC, a light guiding channel is created, called as a photonic crystal waveguide (PCW). Even if the waveguide has a 90-degree corner, the waveguide only has a very little loss. Completely different from conventional waveguides with basic total internal reflection, the PCW mainly utilizes a waveguide effect of a defect state; a new photon, state is formed inside a photonic band gap (PBG) due to the introduction of the defect, while the photon state density deviating from the defect state is zero. Therefore, the PCW realizes light transmission in a defect mode, without causing mode leakage. The PCW is a basic device for forming optical integrated circuits, the right-angle PCW can improve the integration level of optical circuits, and the research related to right-angle PCWs has important significance for the development of the optical integrated circuits.

SUMMARY OF PRESENT INVENTION

The present invention aims at overcoming the defects in the prior art to provide a right-angle waveguide based on a circular-cylinder-type square-lattice photonic crystal and a single compensation scattering cylinder with high refractive index, and the right-angle waveguide has extremely low reflectance and very high transmission rate.

To achieve the above aim, the prevent invention is realized through a technical solution below:

The right-angle waveguide based on said circular-cylinder-type square-lattice photonic crystal and the single compensation scattering cylinder with high refractive index according to the present invention is built in a PhC formed from first dielectric cylinders with high refractive index arranged in a background dielectric with low refractive index according to square lattice. In the PhC, one row and one column of said first dielectric cylinders with high refractive index are removed to form said right-angle waveguide. A second dielectric cylinder with high refractive index is arranged at the corner of said right-angle waveguide; and said second dielectric cylinder is a compensation scattering cylinder. index.

Said second dielectric cylinder is a semi-circular cylinder, an arch shaped cylinder, a circular cylinder, a triangular cylinder, a polygonal cylinder of more than three sides, or a cylinder, of which the outline of the cross section is a smooth closed curve.

Said second dielectric cylinder is the semi-circular cylinder.

The material of said dielectric cylinders with high refractive index is Si, gallium arsenide, titanium dioxide, or a different dielectric with refractive index of more than 2.

The material of said dielectric cylinders with high reflective index is Si, and the refractive index of Si is 3.4.

The background dielectric with low refractive index is air, vacuum, magnesium fluoride, silicon dioxide, or a different dielectric with refractive index of less than 1.6.

Said background dielectric with low refractive index is air.

Said right-angle waveguide is a waveguide operating in a transverse electric (TE) mode.

The area of the structure right-angle waveguide is more than or equal to 7a*7a, and a is the lattice constant of the PhC.

A PhC waveguide device of the present invention can be widely applied in various photonic or optical integrated devices. Compared with the prior art, said right-angle PCW according to the present invention has the positive effects below:

1. Said right-angle waveguide based on the circular-cylinder-type square-lattice photonic crystal and the single compensation scattering cylinder with high refractive index according to the present invention has very low reflectance and very high transmission rate, thereby providing a greater space for application of said right-angle PCW;

2. The structure of the present invention is based on multiple scattering theory, phase and amplitude compensations for reducing the reflectance and improving the transmission rate of optical waves transmitted in said structure are realized by said single dielectric compensation scattering cylinder with high refractive index, so as to reduce the reflectance and improve the transmission rate, and therefore, said structure can realize low reflectance and a high transmission rate;

3. Said right-angle waveguide based on the circular-cylinder-type square-lattice photonic crystal and the single compensation scattering cylinder with high refractive index according to the present invention can be used in design for large-scale optical integrated circuits; the optical circuits are concise and are convenient to design, and said right-angle waveguide facilitates large-scale integration of optical circuits;

4. Said right-angle waveguide based on the circular-cylinder-type square-lattice photonic crystal and the single compensation scattering cylinder with high refractive index according to the present invention can realize connection and coupling of different elements in optical circuits and among different optical circuits, thereby being favorable to lowering the cost.

DETAILED DESCRIPTION OF PREFERRED EMBODIMENTS

Specific implementation manners of the present invention are further illustrated in detail in combination with the drawings.

Figure 1:
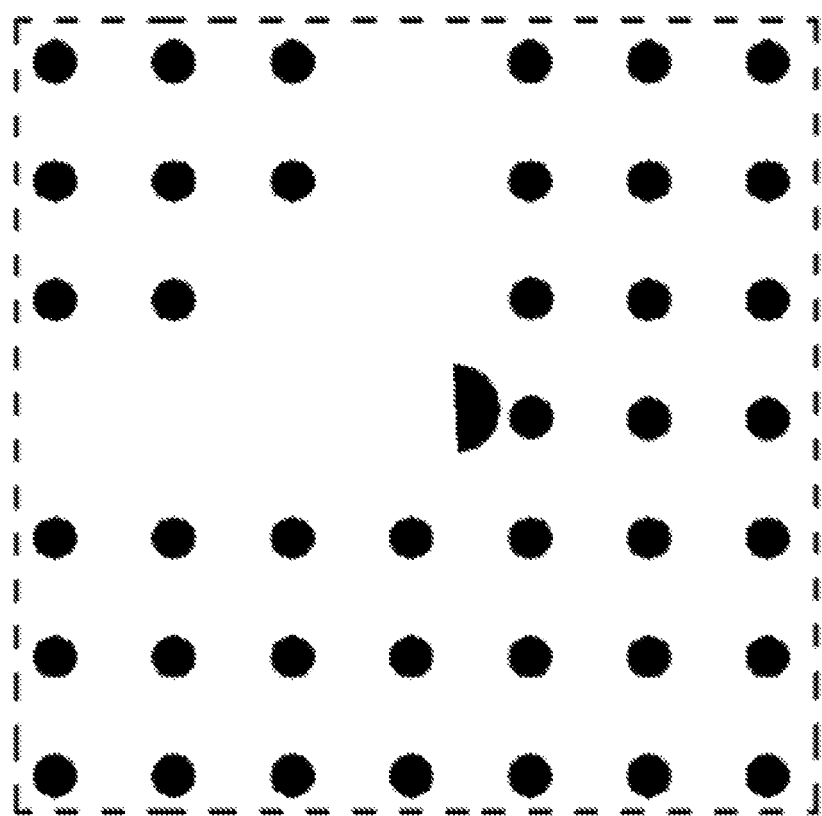
FIG. 1 is the schematic diagram of the core region of the structure of the right-angle waveguide based on a circular-cylinder-type square-lattice photonic crystal and a single compensation scattering cylinder with high refractive index according to the present invention.

As shown in FIG. 1, a right-angle waveguide based on a circular-cylinder-type square-lattice PhC and a single compensation scattering cylinder with high refractive index according to the present invention is a PhC formed from said first dielectric cylinders with high refractive index arranged in a background dielectric with low refractive index according to square lattice. In the PhC, one row and one column of said first dielectric cylinders with high refractive index are removed to form the right-angle waveguide. A second dielectric cylinder with high refractive index is arranged at the corner of the right-angle waveguide, said second dielectric cylinder is a compensation scattering dielectric cylinder, and a compensation reflected wave generated by the second dielectric cylinder is offset by an intrinsic reflected wave in the waveguide without said compensation scattering dielectric; said compensation scattering dielectric cylinder is further adopted as: a semi-circular cylinder, an arch shaped cylinder a square cylinder, a triangular cylinder, a polygonal cylinder of more than three sides, or, further a cylinder, of which the outline of the cross section is a smooth closed curve; said second dielectric cylinder (compensation scattering dielectric cylinder) is the semi-circular cylinder; and the material of said first dielectric cylinders with high refractive index is respectively adopted as Si, gallium arsenide, titanium dioxide, or a different dielectric with refractive index of more than 2 and the background dielectric with low refractive index is adopted as air, vacuum, magnesium fluoride, silicon dioxide, or a different dielectric with refractive index of less than 1.6.

Figure 2:
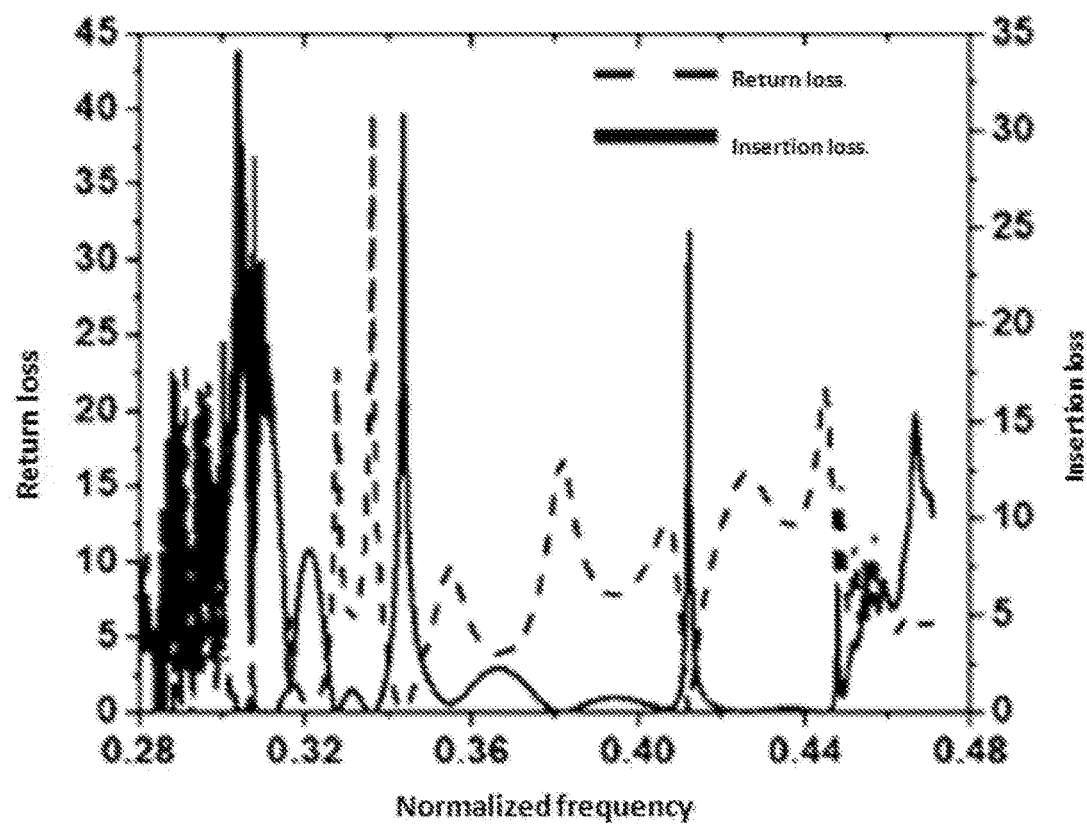
FIG. 2 is the normalized frequency-a transmission characteristic diagram of the right-angle waveguide based on the circular-cylinder-type square-lattice photonic crystal and the single compensation scattering cylinder with high refractive index according to the present invention.

Six embodiments are shown below according to the above result:

Embodiment 1: the lattice constant of said square-lattice PhC is a; said first dielectric cylinders with high refractive index are adopted as circular cylinders with a radius of 0.18a; the polarization of optical waves transmitted in the waveguide is TE form; said second dielectric cylinder is a semi-circular cylinder, namely, the radius of the semi-circular compensation scattering dielectric cylinder with high refractive index at the lower right corner is 0.39312a; the displacements of said compensation scattering dielectric cylinder in the X direction and in the Z direction measured from the original benchmark point are respectively 0.63999a and 0.06213a, and the rotation angle is 267.446859 degrees; the position of an optical source measured from the coordinate origin, in the X direction and in the Z direction is (−4a, 0); and the initial phase of incident light (the optical source) is 0 degree. The material of the background dielectric with high refractive index is Si, and the refractive index of Si is 3.4; and the background dielectric with low refractive index is, air. The structure size of the right-angle waveguide is 15a*15a, a return loss spectrum and an insertion loss spectrum of the right-angle waveguide formed in the PhC are then obtained and shown in FIG. 2, the horizontal axis part of the figure is the operating frequency of the structure, the longitudinal axis part of the figure indicates transmission, the dash line in the figure indicates the return loss of the structure (defined as: LR=−10 log (PR/PI), while the solid line in the figure indicates the insertion loss (defined as: LI=−10 log (PT/PI), wherein PI is the incident power of the structure, PR is the reflection power of the structure, and PT is the transmission power of the structure. At the normalized frequency of 0.336($\omega a/2\pi c$), the maximum return loss and the minimum insertion loss of the right-angle waveguide formed in the PhC are 39.88 dB and 0.001 dB.

Embodiment 2: the lattice constant a of said-square-lattice PhC is 0.5208 µm, so that the optimal normalized wavelength is 1.71 µm; said first dielectric cylinders with high refractive index are adopted as circular cylinders with a radius of 0.093744 µm; the polarization of optical waves transmitted in the waveguide is TE form; said second dielectric cylinder is a semi-circular cylinder, namely, the radius of the semi-circular compensation scattering dielectric cylinder with high refractive index at the lower right corner is 0.204738 µm; the displacements of said compensation scattering dielectric cylinder in the X direction and in the Z direction measured from the original benchmark point are respectively 0.333311 µm and 0.032361 µm, and the rotation angle is 267.446859 degrees; the position of an optical source measured from the coordinate origin in the X direction and in the Z direction is (−2.0832, 0) (µm); and the initial phase of incident light (the optical source) is 0 degree. The material of the background dielectric with high refractive index is silicon (Si), and the refractive index of Si is 3.4; and the background dielectric with low refractive index is air. The structure size of the right-angle waveguide formed in the PhC is 15a*15a, and the maximum return loss and the minimum insertion loss of the right-angle waveguide formed in the PhC are 21.532672 dB and 0.050712 dB.

Embodiment 3: the lattice constant a of said square-lattice PC is 0.5208µm, so that the optimal normalized wavelength is 1.55 µm; said first dielectric cylinders with high refractive index are adopted as circular cylinders with a radius of 0.093744; the polarization of optical waves transmitted in the waveguide is TE form; said second dielectric cylinder is a semi-circular cylinder, namely, the radius of the semi-circular compensation scattering dielectric cylinder with high refractive index at the lower right corner is 0.204738 µm; the displacements of said compensation scattering dielectric cylinder in the X direction and in the Z direction by taking the original point as the benchmark are respectively 0.333311 µm and 0.032361 µm, and the rotation angle is 267.446859 degrees; the position of an optical source measured from the coordinate origin in the X direction and in the Z direction is (−2.0831 0) (µm); and the initial phase of incident light (the optical source) is 0 degree. The material of the background dielectric with high refractive index is silicon (Si), and the refractive index of Si is 3.4; and the background dielectric with low refractive index is air. The structure size of the right angle waveguide formed in the PhC is 15a*15a, and the maximum return loss and the minimum insertions loss of the right-angle waveguide formed in the PhC are respectively 39.88 dB and 0.0018 dB.

Embodiment 4: the lattice constant a of said square-lattice PhC is 0.336 μm, so that the optimal normalized wavelength is 1.00 μm; said first dielectric cylinders with high refractive index are adopted as circular cylinders with a radius of 0.06048 μm; the polarization of optical waves transmitted in the waveguide is TE form; said second dielectric cylinder is a semi-circular cylinder, namely, the radius of the semi-circular compensation scattering dielectric cylinder with high refractive index at the lower right corner 0.132088 μm; the displacements of said compensation scattering dielectric cylinder in the X direction and in the Z direction measured from the original benchmark point are respectively 0.215037 μm and 0.020876 μm, and the rotation angle is 287.446859 degrees: the position of an optical source measured from the coordinate origin in the X direction and in the Z direction is (−1.344, 0) (μm); and the initial phase of incident light (the optical source) is 0 degree. The material of the background dielectric with high refractive index is silicon (Si), and the refractive index of Si is 3.4; and the background dielectric with low refractive index is air. The structure size of the right-angle waveguide formed in the PhC is 15a*15a, and the maximum return loss and the minimum insertion loss of the right-angle waveguide formed in the PhC are 39.88 dB and 0.0018 dB.

Embodiment 5: the lattice constant a of said square-lattice PhC is 0.49728 μm, so that the optimal normalized wavelength is 1.48 μm; said first dielectric cylinders with high refractive index are adopted as circular cylinders with a radius of 0.08951 μm; the polarization of optical waves transmitted in the waveguide is TE form; said second dielectric cylinder is a semi-circular cylinder, namely, the radius of the semi-circular compensation scattering dielectric cylinder with high refractive index at the lower right corner is 0.195491 μm; the displacements of said compensation scattering dielectric cylinder in the X direction and in the Z direction by taking the original point as the benchmark are respectively 0.318254 μm and 0.030896 μm, and the rotation angle is 267.446859 degrees; the position of an optical source measured from the coordinate origin in the X direction and in the Z direction is (−1.98912, 0) (μm); and the initial phase of incident light (the optical source) is 0 degree. The material of the background dielectric with high refractive index is silicon (Si), and the refractive index of Si is 3.4; and the background dielectric with low refractive index is air. The structure size of the right-angle waveguide formed in the PhC is 15a*15a, and the maximum return loss and the minimum insertion loss of the right-angle waveguide formed in the PhC are 39.88 dB and 0.0018 dB.

Embodiment 6: the lattice constant a of said square-lattice PhC is 168 μm, so that the optimal normalized wavelength is 500 μm; said first dielectric cylinders with high refractive index are adopted as circular cylinders with a radius of 30.24 μm; the polarization of optical waves transmitted in the waveguide is TE form; said second dielectric cylinder is a semi-circular cylinder, namely, the radius of the semi-circular compensation scattering dielectric cylinder with high refractive index at the lower right corner is 66.04416 μm; the displacements of said compensation scattering dielectric cylinder in the X direction and in the Z direction measured from the original benchmark point are respectively 107.5183 μm and 10.43784 μm, and the rotation angle is 267.446859 degrees, and the position of an optical source measured from the coordinate origin in the X direction and in the Z direction is (−672, 0) (μm); and the initial phase of incident light (the optical source) is 0 degree. The material of the background dielectric with high refractive index is silicon (Si), and the refractive index of Si is 3.4; and the background dielectric with low refractive index is air. The structure size of the right-angle waveguide formed in the PhC is 15a*15a, and the maximum return loss and the minimum insertion loss of the right angle waveguide having the photonic crystal are 39.88 dB and 0.0018 dB.

The above detailed description is only for clearly understanding the present invention and should not be taken as an unnecessary limit to the present invention. Therefore, any modification made to the present invention is apparent for those skilled in the art

We claim:

1. A right-angle waveguide based on a circular-cylinder-type square-lattice photonic crystal and a single compensation scattering cylinder with a high refractive index, characterized in that: said right-angle waveguide is built in a photonic crystal (PhC) formed from, first dielectric cylinders with the high refractive index arranged in a background dielectric with a low refractive index according to a square lattice; in the PhC, one row and one column of said first dielectric cylinders with the high refractive index are removed to form the right-angle waveguide; a second dielectric cylinder with the high refractive index is arranged at a corner of the right-angle waveguide; said second dielectric cylinder is the single compensation scattering cylinder; and each first dielectric cylinder is a circular cylinder with the high refractive index; and said second dielectric cylinder is a semi-circular cylinder.

2. The right-angle waveguide based on said circular-cylinder-type square lattice photonic crystal and said single compensation scattering cylinder with the high refractive index according to claim 1, characterized in that: the material of said first dielectric cylinders with the high refractive index is Si, gallium arsenide, titanium dioxide, or a different dielectric with a refractive index of more than 2.

3. The right-angle waveguide based on said circular-cylinder-type square-lattice photonic crystal and said single compensation scattering cylinder with the high refractive index according to claim 2, characterized in that: the material of said first dielectric cylinders with the high refractive index is silica, and the refractive index of Si is 3.4.

4. The right-angle waveguide based on said circular-cylinder-type square-lattice photonic crystal and said single compensation scattering cylinder with the high refractive index according to claim 1, characterized in that: said background dielectric with the low refractive index is air vacuum, magnesium fluoride, silicon dioxide, or, a different dielectric with a refractive index of less than 1.6.

5. The right-angle waveguide based on said circular-cylinder-type square-lattice photonic crystal and said single compensation scattering cylinder with the high refractive index according to claim 4, characterized in that: said background dielectric with the low refractive index is air.

6. The right-angle waveguide based on said circular-cylinder-type square-lattice photonic crystal and said single compensation scattering cylinder with the high refractive index according to claim 1, characterized in that said right-angle waveguide is a waveguide operating in a TE mode.

7. The right-angle waveguide based on said circular-cylinder-type square-lattice photonic crystal and said single compensation scattering cylinder with the high refractive index according to claim 1, characterized in that: an area of the right-angle waveguide is more, than or equal to 7a*7a, and a is the lattice constant of the PhC.

* * * * *